United States Patent
McCoy et al.

(10) Patent No.: US 9,602,851 B2
(45) Date of Patent: Mar. 21, 2017

(54) METHOD AND APPARATUS FOR SWITCHING BETWEEN A NATIVE APPLICATION AND A SECOND APPLICATION

(75) Inventors: Charles McCoy, Coronado, CA (US); Ling Jun Wong, Escondido, CA (US); True Xiong, San Diego, CA (US)

(73) Assignees: SONY CORPORATION, Tokyo (JP); SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 13/327,086

(22) Filed: Dec. 15, 2011

(65) Prior Publication Data

US 2012/0227076 A1   Sep. 6, 2012

Related U.S. Application Data

(60) Provisional application No. 61/442,017, filed on Mar. 1, 2011.

(51) Int. Cl.
*H04N 21/41* (2011.01)
*H04N 21/858* (2011.01)
(Continued)

(52) U.S. Cl.
CPC ..... *H04N 21/2387* (2013.01); *H04N 21/4126* (2013.01); *H04N 21/44227* (2013.01);
(Continued)

(58) Field of Classification Search
CPC ........... H04N 21/4126; H04N 21/2387; H04N 21/41407; H04N 21/252; H04N 21/2541;
(Continued)

(56) References Cited

U.S. PATENT DOCUMENTS 8,060,902 B2 * 11/2011 Leyendecker et al. ......... 725/31
2004/0068756 A1 * 4/2004 Chiu ............................. 725/135
(Continued)

FOREIGN PATENT DOCUMENTS

| CN | 1805570 | 7/2006 |
| CN | 101345938 | 1/2009 |

(Continued)

OTHER PUBLICATIONS

Office Action issued in corresponding Chinese application No. 201210020791.5 dated Mar. 19, 2014.
(Continued)

*Primary Examiner* — Benjamin R Bruckart
*Assistant Examiner* — Aklil Tesfaye
(74) *Attorney, Agent, or Firm* — Frommer Lawrence & Haug LLP; William S. Frommer

(57) ABSTRACT

A system and method for controlling a native application and a second application. The second application may be launched in a mobile device for controlling an IPTV device. The method includes executing the native application that includes a first function to implement a device discovery process and a second function to designate a discovered device as a selected device. The second application is executed according to settings of the native application. For example, the native application may be set as a parent and the second application may be set as a child. The second application and the native application may be synchronized such that second application includes functions for controlling the selected device. Additionally, the native device may transmit information about the selected device to the second application.

18 Claims, 7 Drawing Sheets

(51) Int. Cl.
*H04N 21/478* (2011.01)
*H04N 21/235* (2011.01)
*H04N 21/43* (2011.01)
*H04N 21/8543* (2011.01)
*H04N 21/462* (2011.01)
*H04N 21/2387* (2011.01)
*H04N 21/442* (2011.01)
*H04N 21/61* (2011.01)

(52) U.S. Cl.
CPC ....... *H04N 21/478* (2013.01); *H04N 21/6125* (2013.01); *H04N 21/8586* (2013.01)

(58) Field of Classification Search
CPC ............. H04N 21/812; H04N 21/8586; H04N 21/2393; H04N 21/4627; H04N 21/4307; H04N 21/478; H04N 21/235; H04N 21/25891; H04N 21/2181; H04N 21/2668; H04N 21/2385; H04N 21/25833; H04N 21/43615; H04L 67/306
USPC ........................................ 725/25, 80–81, 110
See application file for complete search history.

(56) References Cited

U.S. PATENT DOCUMENTS

| | | | |
|---|---|---|---|
| 2005/0028208 A1* | 2/2005 | Ellis et al. | 725/58 |
| 2006/0179411 A1* | 8/2006 | Wolf et al. | 715/751 |
| 2007/0136778 A1* | 6/2007 | Birger et al. | 725/117 |
| 2008/0066124 A1* | 3/2008 | Igoe et al. | 725/81 |
| 2008/0155062 A1* | 6/2008 | Rabold et al. | 709/219 |
| 2008/0168185 A1* | 7/2008 | Robbin et al. | 709/248 |
| 2009/0085920 A1* | 4/2009 | Teng et al. | 345/520 |
| 2009/0100147 A1* | 4/2009 | Igarashi | 709/218 |
| 2009/0249448 A1* | 10/2009 | Choi | H04L 63/0815 726/4 |
| 2010/0011135 A1* | 1/2010 | Jawa et al. | 710/19 |
| 2010/0219976 A1* | 9/2010 | Park et al. | 340/825.22 |
| 2010/0235830 A1 | 9/2010 | Shukla et al. | |
| 2010/0254370 A1* | 10/2010 | Jana et al. | 370/352 |
| 2011/0086631 A1* | 4/2011 | Park et al. | 455/419 |
| 2011/0151890 A1* | 6/2011 | Platt et al. | 455/456.1 |
| 2011/0167447 A1* | 7/2011 | Wong | 725/40 |
| 2011/0231872 A1* | 9/2011 | Gharachorloo et al. | 725/28 |
| 2012/0020428 A1* | 1/2012 | Roth et al. | 375/295 |
| 2012/0084466 A1* | 4/2012 | Brown et al. | 709/248 |
| 2012/0166655 A1* | 6/2012 | Maddali et al. | 709/228 |

FOREIGN PATENT DOCUMENTS

| | | |
|---|---|---|
| CN | 101388954 | 3/2009 |
| CN | 101944283 | 1/2011 |

OTHER PUBLICATIONS

Office Action issued Jan. 29, 2015 in the corresponding Chinese application No. 201210020791.5.

\* cited by examiner

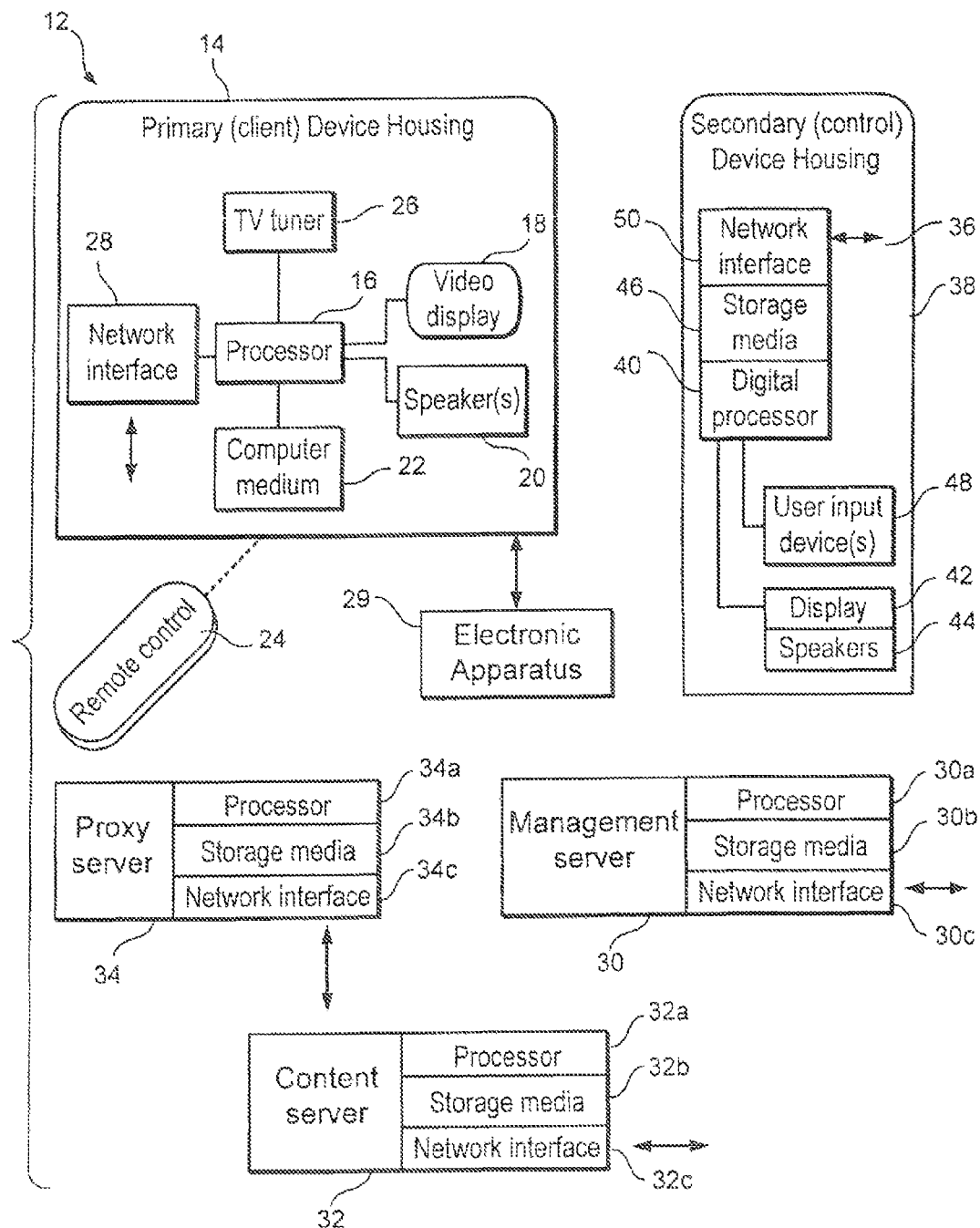
F I G. 1

METHOD AND APPARATUS FOR SWITCHING BETWEEN A NATIVE APPLICATION AND A SECOND APPLICATION

CLAIM TO PRIORITY

This application claims the benefit of previously filed provisional application Ser. No. 61/442,017, filed on Mar. 1, 2011, which is hereby incorporated by reference in its entirety herein.

BACKGROUND

1. Field of the Invention

This invention relates generally to a system and method of controlling one device capable of accessing Internet Protocol Television (IPTV) using a second device and more specifically to switching between a native IPTV control application and a second application.

2. Background Discussion

IPTV is capable of receiving services delivered using the architecture and networking methods of the Internet Protocol Suite as well as services delivered using a broadcasting network. IPTV services include, for example, live television, time-shifted programming, video on demand (VOD), and on-line transactions.

SUMMARY

One embodiment of the present invention is directed to a system and method of controlling an IPTV device. The method includes steps of launching a native application for discovering the IPTV device, launching a second application, for example, a web application for browsing program lists, displaying the native application and the second application on the same screen, controlling the IPTV device using the native application and the second application, and conducing synchronization between the native application and the second application to permit seamless switching therebetween.

Another embodiment of the present invention is directed to a method an apparatus for switching between two applications with both applications remembering their states.

Yet another embodiment of the present application is directed to a seamless transition between a native application and a second application. The native application is responsible for device discovery and native TV control. The second application may be a web application that is responsible for Internet video link browsing and Internet video link communication with the IPTV device.

Yet another embodiment of the present invention is directed to a method ("the method"), which is typically executed by a processor, for controlling a native application and a second application. The second application may be launched in a mobile device for controlling an IPTV device. The method includes the steps of executing a discovery process that select a first device. This first device may be, for example, a device that is reachable. (The term "reachable" meaning available for communication or interaction). Alternatively, a second function could be used to designate a discovered device as a selected device. The second application is executed according to settings of the native application. For example, the native application may be set as a parent and the second application may be set as a child. Alternatively, the second application may be set as the parent and the native application may be set as a child. Alternatively, both the native application and the second application may be launched from some other parent application, which may be the operating system. The second application and the native application may be synchronized such that second application includes functions for controlling the selected device. Additionally, the native application may transmit information about the selected device to the second application.

Yet another embodiment of the present invention is directed to the method described above, wherein the native application identifies more than one reachable device and presents an inquiry for a user to select one reachable device.

Yet another embodiment of the present invention is directed to the method as described above in which the first device discovery process identifies more than one reachable device and provides a list of reachable devices to the second application. The second application then presents a list of multiple reachable devices to the user. The user can then select a desired target device from the plurality of identified reachable devices.

Yet another embodiment of the present invention is directed to the method described above wherein the first device discovery process, which may be executed as part of the native application, communicates an availability, or reachability, of a plurality of first devices to the second application. The second application then identifies, or selects, a desired particular first device to target from the plurality of first devices.

Yet another embodiment of the present invention is directed to the method described above wherein the first device discovery process defaults to a first device that has the most capabilities as a selected first device.

Yet another embodiment of the present invention is directed to the method described above wherein the first device discovery process defaults to a most recently used first device as a selected first device.

Yet another embodiment of the present invention is directed to the method described above wherein the selected first device is selected by a default setting set by a user and stored in a user profile associated with the user.

Yet another embodiment of the present invention is directed to the method described above wherein the second application presents choices for alternate first devices to a user.

Yet another embodiment of the present invention is directed to the method described above wherein the native application presents choices for alternate first devices to a user.

Yet another embodiment of the present invention is directed to the method described above wherein the choices for alternate first devices are presented by the second application based on information from the native application related to first device availability and first device reachability.

Yet another embodiment of the present invention is directed to the method described above and also includes identifying device capabilities of one or more first devices; and presenting the device capabilities of the one or more first devices to a user.

Yet another embodiment of the present invention is directed to the method described above and also includes determining user criteria for a particular user. The device capabilities of the first devices are compared to the user criteria. A list of first devices is displayed to a user. The list is provided in a sequence that is a function of the comparing step.

Yet another embodiment of the present invention is directed to the method described above, wherein the native application executes the first device discovery process.

Yet another embodiment of the present invention is directed to the method described above, wherein the second application executes the first device discovery process.

Yet another embodiment of the present invention is directed to the method described above, wherein the second application controls IPTV program browsing, displays functionalities associated with the IPTV device, and executes communication between the control device and the IPTV device.

Yet another embodiment of the present invention is directed to the method described above, wherein the information about the selected device includes an identifier of the selected device and a list of functionalities associated with the selected device.

Yet another embodiment of the present invention is directed to the method described above, wherein the second application executes functions different from the native application.

Yet another embodiment of the present invention is directed to the method described above, wherein the native application transmits user authentication information to the second application.

Yet another embodiment of the present invention is directed to the method described above, wherein the native application transmits a user profile to the second application.

Yet another embodiment of the present invention is directed to the method described above, wherein the native application defaults to a last selected device as a selected device.

Yet another embodiment of the present invention is directed to the method described above, wherein when only a single device is discovered, the native application designates that single device as a selected device.

Yet another embodiment of the present invention is directed to the method described above, wherein the native application defaults to the most often used device as a selected device.

Yet another embodiment of the present invention is directed to the method described above, wherein synchronizing the second application and the native application is required when a change occurs in the native application, the second application, or a platform of the mobile device.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments, and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 1 shows a block diagram of one embodiment of the present invention.

DETAILED DESCRIPTION

Figure 2A:
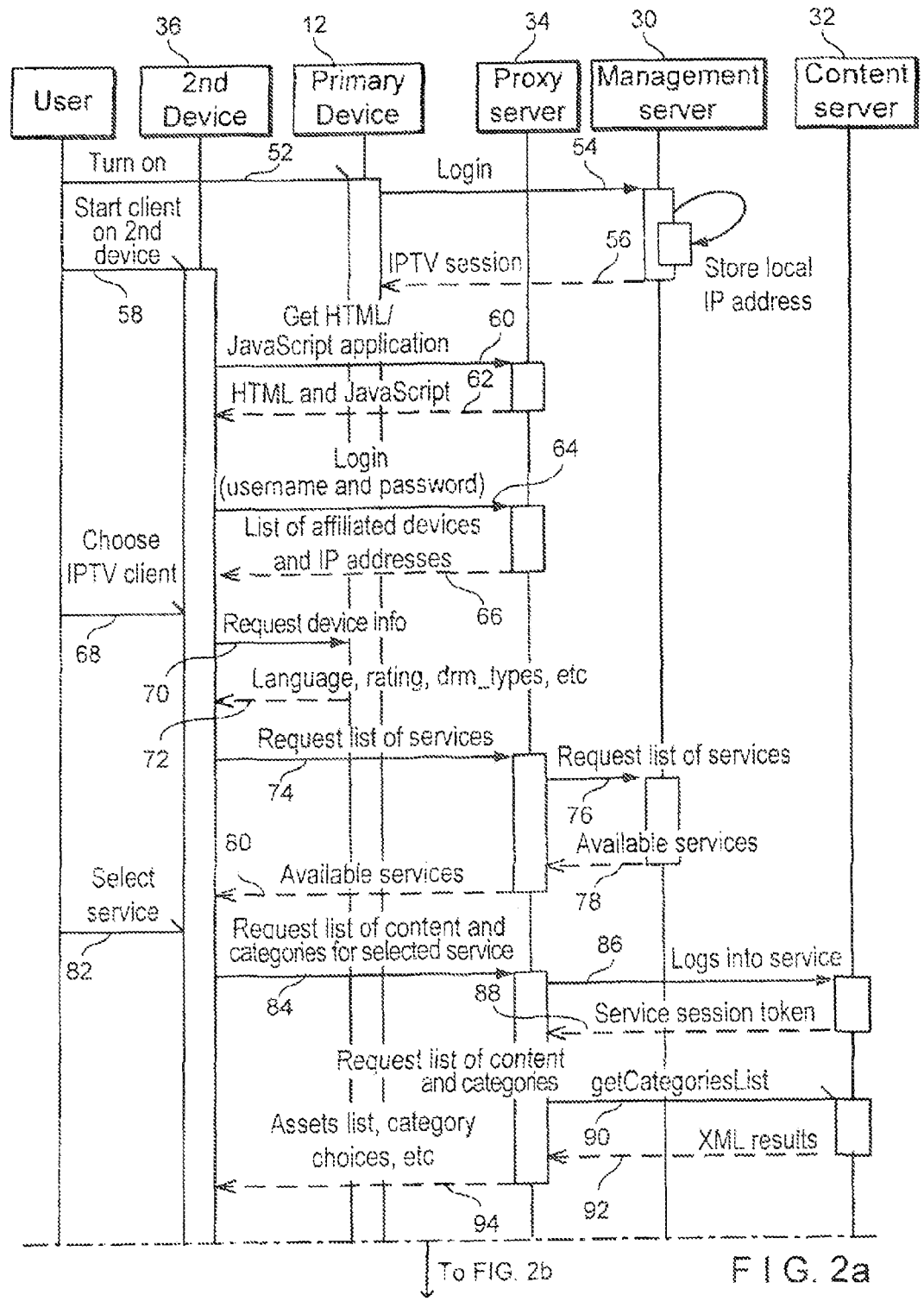
FIGS. 2a and 2b show a series of steps according to an embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, processing facilities, or processing modules. The processing devices, or facilities, or modules, may be coupled such that portions of the processing and/or data manipulation may be performed at one or more processing devices, facilities or modules and shared or transmitted between a plurality of processing devices, facilities or modules.

An IPTV device may be used to control home appliances through IPTV. These home appliances include, for example, video players, game players, home theater systems, digital video recorders, air conditioners, and etc. Household electrical appliances and audio-visual apparatuses, such as video cassette recorders (VCRs), televisions, air conditioners, and lighting apparatuses, may be furnished with remote controls. These remote controls each have operation units and functions specific to each apparatus. In order to control home appliances, a dedicated remote control may be placed in a vicinity of an associated home appliance. IPTV provides the ability to integrate different functions or different applications into a single control device to control multiple appliances. This single control device may be a smart phone, a digital personal assistant, a personal computer, lap top computer, tablet, or other device with adequate processing and/or storage capabilities. The single control device may transmit control signals through a public network or Internet or other network of operatively coupled computers, or processing devices or modules to an IPTV device, which uses the control command to control home appliances.

An IPTV device can access a vast pool of contents provided by numerous content providers. The IPTV device may also be used to control further distribution of content that has been provided by a third party to the IPTV device so that unauthorized access is prevented. Typically, IPTV is controlled by a single input device and has a single display device. As a shared device that is viewed by several users it is helpful to permit this sharing without excessively raising hardware costs.

Accordingly, a method is provided to enable a user browsing content on a second device to have their selection played by a first device. The user can then continue to browse the content on any number of second devices without interrupting the content that is playing on the first device. The first device may be an IPTV. The second device may be another electronic device. The method include an architecture design and implementation that allows a user to navigate, browse, and search content on a second device that may be a consumer electronic device such as a Sony Ericsson® smart phone, VAIO® PC, VAIO® laptop, MYLO®, personal computer, or other apparatus with sufficient processing and storage capability, or any device with a web browser. Concurrently, while a user is using the first device, another user can perform these activities on the second device and send a media selection to the first device of the user's choice for playback.

A second device may act as a visual aid to the IPTV, but does not require additional investments by the user because it makes use of a device (such as a cellphone, laptop, etc) which most users would typically already have in their possession. The second device executes a program that allows the second device to act as the visual aid. It is a low cost solution which opens up a huge window of business and technical opportunities. It is a favorable complement to the IPTV because the device has strengths in data entry, processing power and user experience in content management. Thus, users will be able to use their personal devices, such as a cellphone, to browse content in their own language, perform data entry, search for content, manage their content, perform transactions and personalize their experience without disturbing the big screen of a first device. Users only send the content for playback on the IPTV when they are ready to watch it; and playback of proprietary content does not occur on the non-authentic device so security risks are minimized. The program may be written in HTML, which can be loaded by any device with a browser, hence not limited to only a small set of compatible devices.

An IPTV system typically includes an IPTV device (also referred to as an IPTV client device) including a processor for controlling a video display to present content thereon. The system also includes a second device including a control processor and a management server communicating with the IPTV client over the Internet. The management server and IPTV client communicate with at least one content server such that the content server provides audio video content to the IPTV client for presentation of the content on the video display of the IPTV client. The system further includes a proxy server communicating with the management server and the second device. The IPTV client sends login information to the management server which returns to the IPTV client an IPTV session token that may subsequently be presented by the IPTV client to a content server to obtain content from the content server. The management server receives and stores a local IP address of the IPTV client. Responsive to the second device sending a request to the proxy server for an executable utility, the proxy server returns the utility to the second device. Further, the second device, executing the utility, prompts a user to input to the second device login information. The proxy server, responsive to reception of correct login information from the second device, returns the local IP address of the IPTV client to the second device. The second device uses the local IPTV address to access the IPTV client directly to request information about the IPTV client, which information is returned from the IPTV client to the second device such that the local address of the IPTV client need not be globally addressable. Also the second device sends the information about the IPTV client to the proxy server, requesting a list of services available to the IPTV client from one or more content servers. The proxy server relays the request for a list of services to the management server, which returns the list to the proxy server, with the proxy server in turn sending the list to the second device for presentation of information on the video display. Responsive to a user selection of an element on the list, the second device sends a request for a software asset corresponding to the element to the proxy server. The proxy server requests a service login of the content server providing the asset, and the content server provides to the proxy server a list of assets or categories or services which relays the list to the second device, which is presented on the video display of the second device so that the user can navigate to enter a selection. Responsive to the selection the second device sends a command to the IPTV client to play the selection.

Embodiments include the IPTV client requests of the management server information about the selection received from the second device. The information is returned from the management server to the IPTV client to enable the IPTV client to play content associated therewith. If desired, the proxy server can request of the content server a list of options, and the list is returned to the proxy server. Asset information may be requested by the IPTV client and returned thereto by the content server. Also, a service login received from the second device may be sent by the IPTV client to the content server and a service token returned to the IPTV client in response. When a list of contents is sent to the second device, URL of contents may be removed from the list. The second device requests a content using a unique identifier of the content, the proxy server or the management server may use the unique identifier of the content to locate a corresponding URL of the content. In this way, the second device may not obtain the URL of a content so that unauthorized distributions of content are effectively prevented.

According to an embodiment of the present invention, a consumer electronics device (CE) may act as a second device, which includes a housing holding a display, a network interface, and a processor controlling the display and communicating with the Internet through the network interface. An input device communicates with the processor. The processor executing logic includes sending login information to a proxy server, and receiving from the proxy server, responsive to reception thereby of correct login information, a local IP address of an IPTV client. The processor uses the local IPTV address to access the IPTV client directly to request information about the IPTV client, sending the information about the IPTV client to the proxy server. Responsive to sending the information about the IPTV client to the proxy server, the processor receives content information, presenting it on the display from which a user can select a selected content. The processor commands the IPTV client to play the selected content.

According to an embodiment of the present invention, a proxy server assembly includes at least one processor and at least one network interface communicating with the processor to establish communication between the processor and a wide area network.

According to an embodiment of the present invention, at least one computer readable storage medium is accessible to the processor and bears logic causing the processor to receive login information from a second device. Responsive to a determination that the login information is correct, the server sends to the second device a local IP address of an IPTV client associated with the login information. The server receives from the second device information about the IPTV client requesting a list of services available to the IPTV client from at least one content server and sends a request for the list of services to a management server. The proxy server receives from the management server the list and sends it to the second device for presentation of information on a video display thereof. The proxy server then receives from the second device a request for a software asset and responsive to the request for the software asset, requests a service login of the content server. The proxy server receives back from the content server a list of assets or categories or services and sends the list to the second device. In this way, the list can be presented on a video display of the second device so that a user can navigate to enter a selection to command the IPTV client to play the selection.

According to an embodiment of the present invention, a first device is connected with a plurality of electronic devices. A second device may transmit control commands to the first device using a communication network or internet to control the plurality of electronic devices.

Referring to FIG. 1, an IPTV system may include a first device such as a client consumer electronics device 12, a second device such as another consumer electronics device 38, an electronic device 29 connected with the first device, a management server 30, a proxy server 34, and a content server 32. Each of the above devices and servers may have one or both a wired communication interface and a wireless communication interface.

The client consumer electronics device (CE) 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers. The client consumer electronics device has a unique identifier that, without other means, is able to identify the client consumer electronics device within the IPTV system. The unique identifier may be assigned by a manufacturer or assigned by the management server when the client consumer electronics device is registered in the IPTV system.

To undertake present principles, the processor 16 may access one or more computer readable storage media 22 such as but not limited to RAM-based storage (e.g., a chip implementing dynamic random access memory (DRAM) or flash memory or diskbased-storage. Software code implementing present logic executable by the CE device 12 may also be stored on one of the memories shown to undertake present principles.

The processor 16 can receive user input signals from various input devices including a remote control device 24, a point and click device such as a mouse, a keypad, etc. A TV tuner 26 may be provided in some implementations particularly when the CE device is embodied by a TV to receive TV signals from a source such as a set-top box, satellite receiver, cable head end, terrestrial TV signal antenna, etc. Signals from the tuner 26 are sent to the processor 16 for presentation on the display 18 and speakers 20.

As shown in FIG. 1, a network interface 28 such as a wired or wireless modem or wireless telephony transceiver communicates with the processor 16 to provide connectivity to a wide area network such as the Internet. Double arrows in FIG. 1 indicate network communication between components over wired and/or wireless links. In this way, the client device 12 can communicate with a management server 30 on the Internet and with one or more content servers 32, also on the Internet and communicating with the management server 30.

If desired, each content server 32 may be associated with a respective proxy server 34 which interfaces the content server 32 with the device 12. The servers 30, 32, 34 have respective processors 30a, 32a, 34a accessing respective nontransitory computer readable storage media 30b, 32b, 34b which may be, without limitation, disk-based and/or solid state storage. The servers communicate with a wide area network such as the Internet via respective network interfaces 30c, 32c, and 34c. It is to be understood in view of disclosure below that the CE device 12 particularly when implemented by a non-PC device such as a TV or game console or camera can communicate only with the management server 30 and with content servers 32 that appear on a service list provided to the processor 16 by the management server 30, with the service list not being modifiable by the processor 16.

The electronic device is connected with the first device 12 using a cable such as a 1394 cable or a HDMI cable or using a wireless communication interface such as infrared signals. The electronic device may be a digital video recorder, a Blu-ray Player®, a game player, an audio amplifier, or an air conditioner.

A second device 36 may be another consumer electronics device. The second device 36 may be another TV, game player, video disk player, camera, digital clock radio, mobile telephone, personal digital assistant, laptop computer, etc. The second device 36 with a housing 38 bears a digital processor 40 controlling a visual display 42 and an audible display 44 such as one or more speakers. To undertake present principles, the second or control processor 40 may access one or more computer readable storage media 46 such as but not limited to RAM-based storage (e.g., a chip implementing dynamic random access memory (DRAM) or flash memory or disk-based-storage. Software code implementing present logic executable by the second or control device 36 may also be stored on one of the memories shown to undertake present principles. Further, the second or control processor 40 can receive user input signals from various input devices 48 including a point and click device such as a mouse, a keypad, etc. A network interface 50 such as a wired or wireless modem or wireless telephony transceiver communicates with the processor 40 to provide connectivity to a wide area network such as the Internet.

Figure 2B:
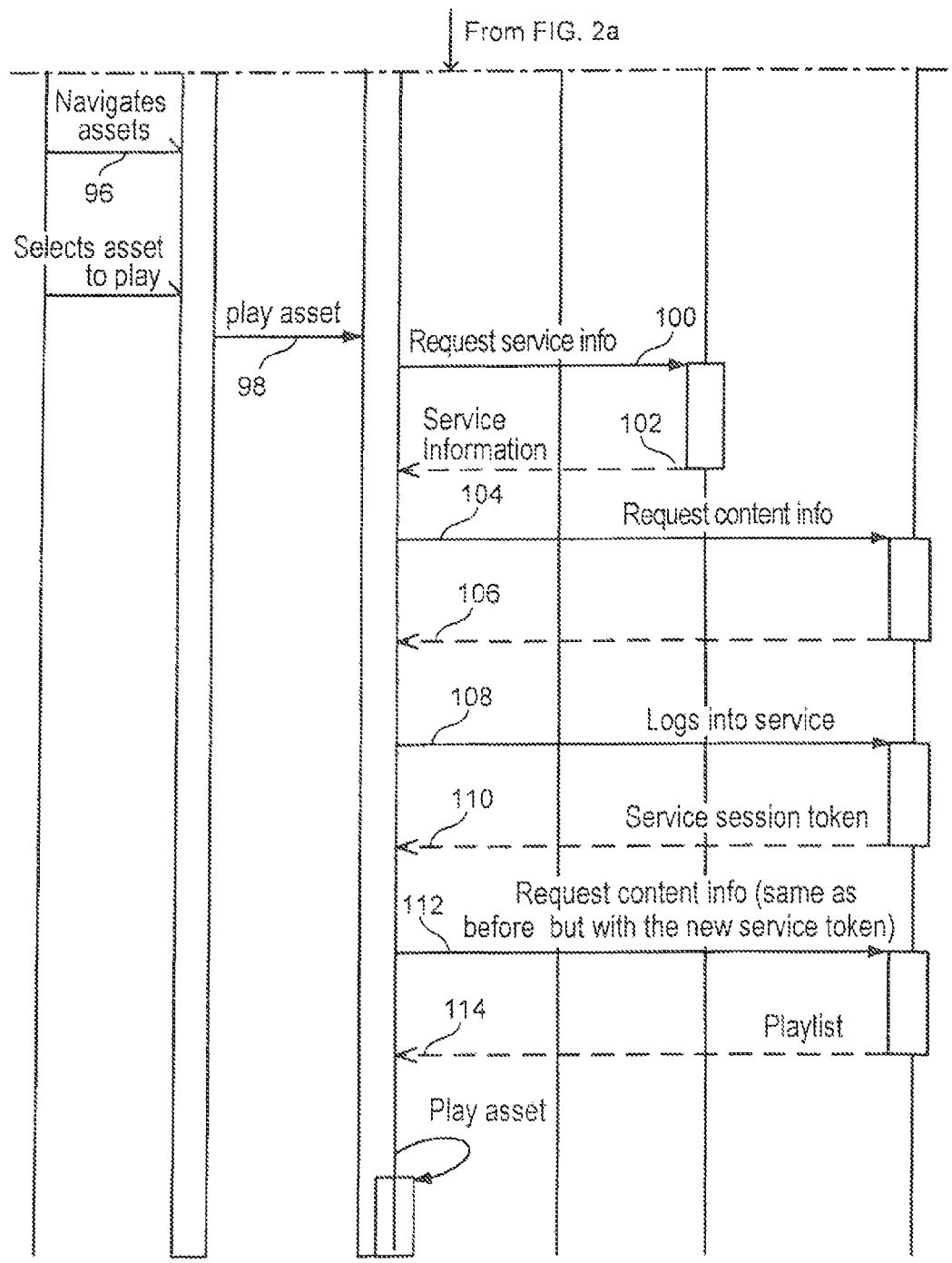

FIGS. 2a and 2b (generally FIG. 2) show an example embodiment of present principles for enabling a user to use a second device 36 to browse assets and select a first device 12 such as a main IPTV client play the content. FIG. 2 assumes that the user has already created an account with the management server 30 and has affiliated the main IPTV device with that account. In general, a user loads the second application in the second device and logs into their user account, which may be the same account used for device registration. Once logged in, a list of compatible IPTV devices is presented. After the user selects a device, a list of services that the device is entitled to is provided. The user browses the services and their content, in his/her preferred language, on the second device as though it is an actual IPTV device such as the first device. Similar transactions, like video rentals or home shopping purchases, can also be made on the second device. Standard IPTV system interaction with service providers occurs on the proxy server, hence creating a firewall between the second device and content providers. Additional navigation features, like hyper-linked text which will open a new window and the management of premium services from a single location, provide better user experience in this IPTV system.

When a piece of content is selected, it may be sent to the IPTV for playback in the form of a reference id which is used by the IPTV to retrieve playback information. By eliminating the presence of the content URL on the second device, the risk of leaking major proprietary information which could result in huge losses is reduced. During the time of playback, the user can continue to browse for other content and queue it for future playback. The IPTV needs to be addressable by the second device to perform playback, which is the case when both devices are on the same local network. The user can also switch devices and resume playback on a different device such as the electronic device 19 in FIG. 1 by going to the recently viewed list and selecting the last video played after switching control to that device.

A detailed description of each state in FIG. 2 is provided as follows.

At state 52 a user turns on the first device 12, hereafter referred to as the "IPTV client" for convenience. At state 54 the IPTV client sends login information including, e.g., user name and password to the management server 30, which at state 56 returns to the IPTV client an IPTV session token that may subsequently be presented by the IPTV client device to a participating content server 32 to obtain content from that server. Also, the management server 30 stores the local IP address of the IPTV client device 12. Alternatively, in another embodiment, the management server 30 does not return a token in response to receiving login information. Subsequently, no token is required to be presented by the IPTV client device to the participating content server 32 to obtain content.

At state 58, the user instantiates an IPTV client control utility on the second device 36. The utility executed on the second device 36, at state 60, sends a request to the proxy server 34, which returns (62) a response in a suitable language, such as hypertext markup language (HTML) with JavaScript for the second device 36 to execute in accordance with description below. This JavaScript® makes asynchronous JavaScript® and extended markup language (XML) (AJAX) calls to the proxy server and to the IPTV client to obtain information to control the IPTV client. In another embodiment, step 60 may not be necessary where other client application implementations are used, such as one where the client application is not downloaded each time it is used. It should also be noted that other technologies (e.g. C, C++, Perl, and Flash) can be used for the implementation of the client application and that neither HTML nor JavaScript® are required.

With more specificity, at state 64 using the JavaScript®, or alternatively, another method of implementing the client application, received from the proxy server 34 the second device 36 prompts the user to input to the second device 36 the user account information, such as account login information, including, e.g., the same user name and password that the IPTV client provided to the management server 30 at 54. Thus, the servers 30, 32, 34 communicate necessary account information between them as needed to realize present principles.

At state 66 the proxy server 34, responsive to a correct user name and password from the second device 36, returns information about all IPTV clients 12 that are affiliated with the user account associated with the user name and password, including their local IP addresses which were stored by the management server 30 after login at 54 (and subsequently provided to the proxy server 34).

When the user inputs to the second device 36 at state 68 a selected IPTV client device (in this example, the IPTV client device 12) to use with the second device, the second device 36, using the local IP address returned at state 66, accesses the IPTV client device 12 directly. The second device 36 requests information about the IPTV client device 12 at state 70, including language information, rating information, digital rights management (DRM) information, etc. as desired, which information is returned from the IPTV client device 12 to the second device 36 at state 72. Since the second device 36 knows the IP address of the IPTV client 12 and consequently communicates directly with the IPTV client device 12, the second device 36 communicates using a local web address of the IPTV client device 12 that need not be globally addressable, and may so communicate as long as the second device 36 and IPTV client device 12 are on the same local network.

At state 74 the second device 36 sends the client information received at state 72 to the proxy server 34, requesting a list of services available to the IPTV client device 12 from one or more of the content servers 32. The proxy server 34 relays the request for a list of services at state 76 to the management server 30, which returns the available services at state 78 to the proxy server 34. The proxy server 34 in turn sends the services list to the second device 36 at state 80 for presentation of available services on, e.g., the second device display 42.

State 82 indicates that a user can input (using, e.g., the second device input device 48) a selection of a service on the list that was returned to the second device at state 80. In response, the second device 36, at state 84, sends a request for a list of content and categories to the proxy server 34 along with a service session token that the second device may have received from the content server 32 via the management server 30.

Responsive to the request, at state 86 the proxy server logs into the service of the content server 32 providing the selected service. At state 88 the content server 32 provides to the proxy server 34 a service session token for the particular content server 34. State 90 indicates that if desired the proxy server 34 may also request a list of content and categories of the content server 32 and the list is returned at state 92 in, e.g., extended markup language (XML) format to the proxy server 34, which relays the assets, categories, services, etc. available for selection to the second device 36 at state 94. When the list of assets or the list of options is provided to the second device, the URL associated with each asset or options are removed. A reference ID is added to the list for each asset and options. The second device requests a particular asset or option by using the reference ID. In this way, the second device may not obtain any URL of the assets or options.

The content available for selection is presented on the second device display 42 so that the user can navigate (96) the display to enter (98) a selection. Responsive to the selection the second device 36 at state 98 sends a command to the IPTV client 12 to play the selection. At state 100 the IPTV client device 12 then requests service information of the management server 30 information about the service the selected asset is in, logging in to the service if required. The requested information is returned from the management server 30 to the IPTV client 12 at state 102, and when the IPTV client 12 receives the asset information it plays the asset at state 116. Note that if the IPTV client is already playing content the new content commanded to be played by the second device is placed in a queue in the IPTV client and played when the current content completes.

Note further that the second device may command the IPTV client to play content by sending to the IPTV client over the home network commands coded as if they were sent from an infrared remote control (IR RC), specifically for example the commands may be in Sony Infrared Remote Control System (SIRCS™) protocol. The second device may transmit command signals to the IPTV client to control the electronic device 29.

As shown in FIG. 2, if desired, temporally between states 102 and 116 a series of messages may be exchanged between the IPTV client 12 and the content server 32. For example, a request for content information may be made (104) by the IPTV client 12 and returned (106) by the content server 32. The above-described logging into the service may be relayed by the IPTV client 12 to the content server 32 at state 108 and a service session token returned to the IPTV client device at state 110 along with the before-mentioned asset information. Also, a request of content information may be made (112) and a playlist returned to (114) the IPTV client 12 device.

The software (e.g., JavaScript®/HTML) that is downloaded at state 62 can be made available to all electronic vendors who wish their users to be able to navigate, browse, and search IPTV content on a second device. In an embodiment in which HTML is used, the software can be used on any client device with a web browser.

The following situations illustrate some scenarios where the second device complements the IPTV's shortcomings, hence providing better user experience for the IPTV user. For example, a group of friends is watching video clips on an IPTV. Each of them are browsing content on their own second display and queuing up selections. In another example, someone is looking for content on a particular subject. They are able to quickly type in search terms using their second device even when those terms contain characters not supported by their IPTV. In another example, a man is watching the end of a ball game on the IPTV while his wife uses a second display to select a movie for them to watch when the game ends. In another example, a user may be away from an IPTV, but the user may use a smart phone as the second device to browse contents and select a preferable content to be played on the IPTV.

In the above-identified situations, using a second device can provide many benefits, such as:

Browsing in own language without disturbing the big screen
Ease of data entry in a language not supported by the IPTV
On-device service affiliation for premium services like Netflix
Cross-device playback and resume from a recently viewed list
Social sharing of content to enhance content proliferation
Management of subscription-based services from a single location
Browsing and queue management when away from the IPTV device or when not in proximity to the IPTV device
One-click Customer service without the need of entering personal or device information
Quick access to relevant device specifications and manuals
Hyper-linked text in forms directs users to informational sites
Content Queue across devices
Advertisement revenue through Second display usage The second device provides an enhanced user experience of the IPTV without adding to the hardware costs of the unit, thus making data entry easy and allows users to browse content on the side. IPTV is also a global solution which connects various IPTV devices together in a cohesive manner through its potential of initiating playback across devices. The system also provides the highest level of customer service to users through its one-click customer service feature, where users do not provide any device information, which can be difficult to retrieve in the event of a device breakdown.

Figure 3:
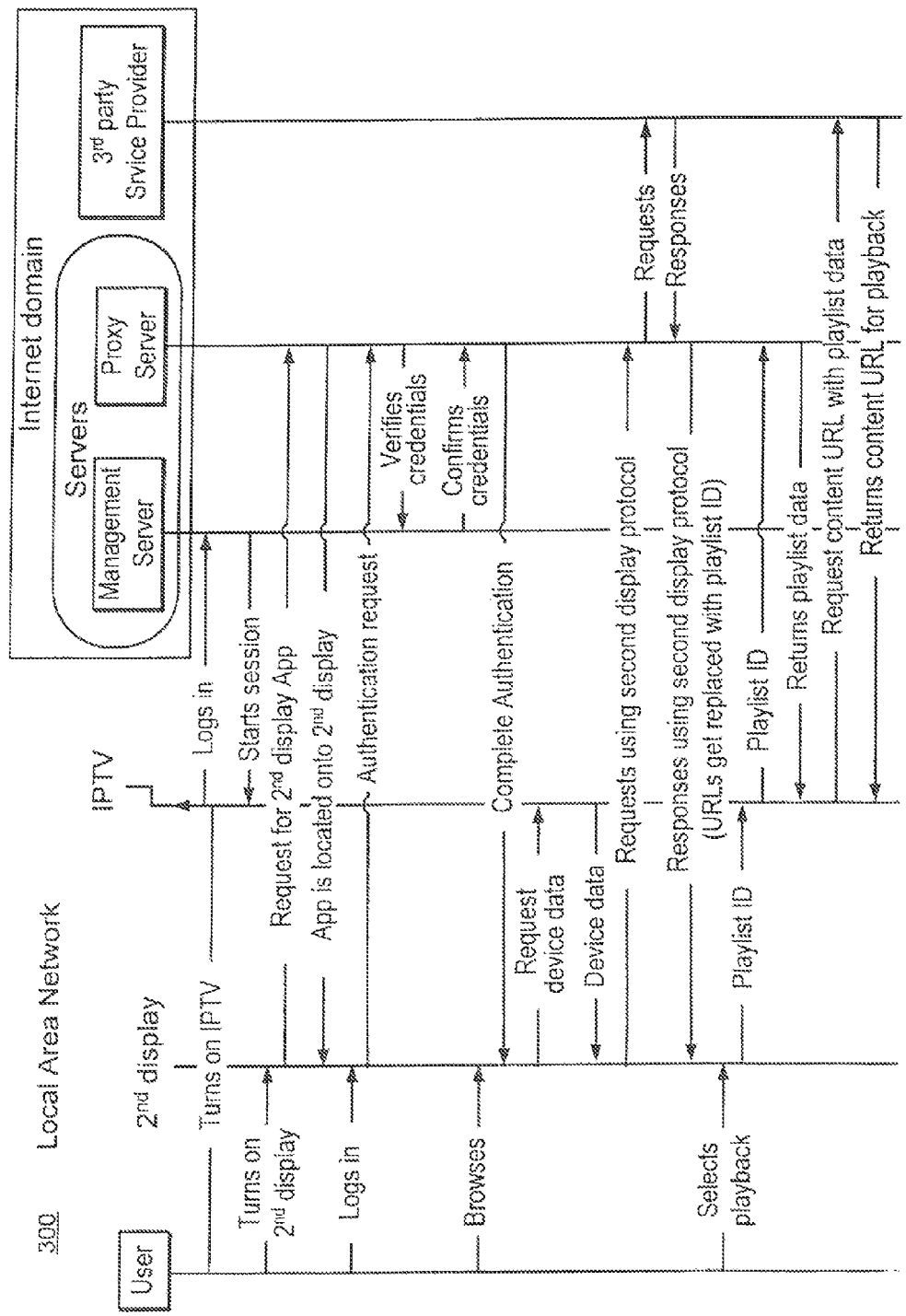
FIG. 3 shows a schematic representation of an embodiment of the present invention.

FIG. 3 shows a schematic representation 300 of an embodiment in which the present invention finds ready application. First a user turns on an IPTV client. The IPTV logs into a management server so that the management server knows which IPTV device is in communication. The user does not have to interact or provide any information as part of this device interaction. The management server starts the session. Then the user turns on the second display, in an embodiment in which the second display does not have the second display application, the second display requests the second display application (app) from the proxy server and the second display application is loaded onto the second display. In another embodiment, the second display application is installed on the second display. Then the user logs into the user account. An authentication request is sent from the second display to the proxy server. The proxy server verifies credentials with the management server, and then the management server confirms credentials with the proxy server. So that authentication is completed.

Then the user browses an Internet video link. After that, the device data is requested from the second display and then the requested device data is sent from the proxy server to the second display device. Thus, the second display device can be used to display content even when the IPTV device is not available. The use of the second display device to display content depends on the display capabilities and display functions of the second display device. The second display sends a request using second display protocol to the proxy server, and then the proxy server requests to the service provider, and the service provider responds. The proxy server responds using a second display protocol to the second display with the associated URL replaced with playlist ID.

After the user selects playback, the second display device attempts to send the playlist ID to the IPTV client device. When the IPTV client device is reachable, the playlist ID is received. Then the playlist ID is sent from the IPTV client to the proxy server, and playlist data is returned from the proxy server to the IPTV client. The IPTV client requests a content URL with playlist data of the service provider, and then the service provider returns the content URL for playback to the IPTV client. When the IPTV client device is not reachable, the playlist ID is not received and the second display device notifies the user that the IPTV client device is not reachable. The second display device stores the Playlist ID for a later attempt at sending to the IPTV client device.

In another embodiment, the second display device may inform a server of the playlist ID and when the IPTV device is connected to the server, may receive the request even when the IPTV device and the second display device are on separate local networks and cannot address each other. In this case, the IPTV device may still not be reachable, as in a case where the IPTV device may not be connected to a power supply, and the request is queued at the server to be sent at a later time when the IPTV device is reachable.

Figure 4:
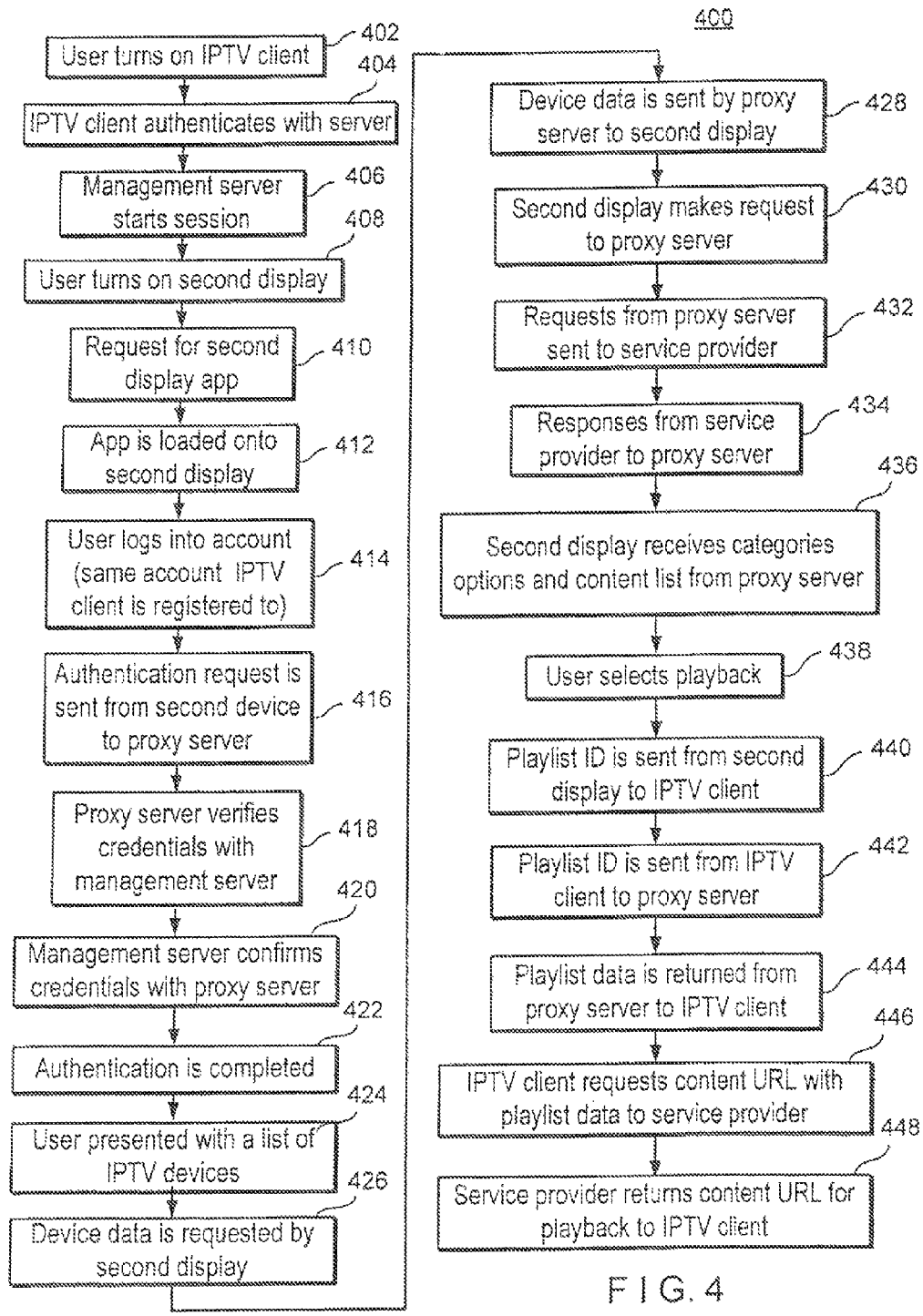
FIG. 4 shows a flow chart of processing steps according to an embodiment of the present invention.

FIG. 4 shows a flow chart 400 of processing steps according to the embodiment of FIG. 3.

The process begins in step 402 in which the user turns on an IPTV client device. After the IPTV client device is registered with the management server, or authenticated with the management server, as shown in step 404, the management server starts the session in step 406. Then in step 408 the user turns on the second display, and, when necessary, sends a request for a second display application to a proxy server, as shown in step 410. The request for the second display application is optional and is used only when desired. When requested, the application is loaded onto the second display in step 412. In step 414 the user logs into the account, which is the account the IPTV is registered. In step 416 an authentication request is sent, from the second display to the proxy server. In step 418 the proxy server verifies the credentials of the IPTV client with the management server, and then in step 420 the management server confirms the credentials with the proxy server. In step 422, authentication is completed. It is an embodiment of the present invention that the server in steps 418 and 420 may be in the same server. Alternatively, there may be more than two servers splitting the server tasks.

In step 424 the user is presented with a list of IPTV devices. This displayed list may be the result of the user seeking possible available IPTYV devices. In step 426 device data, describing the second display, is requested by the second display device. In step 428 the requested device data is sent by the proxy server to the second display device. In step 430 the second display sends a request using a second display protocol to the proxy server. In step 432 requests from the proxy server are sent to the service provider and the service provider responds, as shown in step 434. In step 436, the second display device receives categories, options and a content list from the proxy server. Alternatively, the proxy server may send content to the second display device with the associated URL replaced with playlist ID. Alternatively, the service provider may permit, in some cases, that the URL is sent to the second display device. For example, the second display may have a secure application, and the service provider may allow a second display with a secure application to receive the URL. Thus, the content URL may be transmitted to the IPTV device for playback, rather than having the IPTV device retrieve the data from the server.

In step 438 the user selects playback and then in step 440 the playlist ID is sent from the second display device to the IPTV client device. If the IPTV client does not answer or does not acknowledge the request to play the content, or is unable to play the content at the time, such as when the IPTV client device may be on and reachable, but a viewer has enacted a "do not disturb" mode, the second display device informs the user that the IPTV client device is unreachable (not available to play the content at this time) and queues the request to be repeated at a later time when the IPTV client device is reachable. In step 442 the playlist ID is sent from IPTV client to the proxy server, and playlist data is returned from the proxy server to IPTV client in step 444. In step 446 the IPTV client requests content at the URL associated with playlist data to the service provider, and then in step 448 the service provider returns content at that URL for playback to the IPTV client device. Alternatively, the proxy server may store the URL content and thus, return the URL content to the IPTV client device without the need to request the content at the URL associated with the playlist data from the service provider. Thus, when the proxy server stores the URL, step 446 is not used, rather, once the IPTV client device obtains the URL, the IPTV client device can start playback.

According to an embodiment of the present invention, when a mobile phone is used as the second device to control an IPTV device, two applications may be executed by the mobile phone: a native application and a second application (e.g., a web application). The native application may be responsible for IPTV device control and device discovery. The second application may be responsible for other activities such as, web and TV listing browsing and communication with the IPTV device. A native application is generally designed to run on a device's operating system and machine firmware, and typically should be adapted for different devices. The second application, which may be a web application or browser application is typically, in part or whole, downloaded from a website each time it is run. A web application can usually be accessed from all web-capable mobile devices. For instance, a native application developed for the iPhone will need to run on its proprietary iOS platform, or on Symbian® for many Nokia® devices, and so forth. A web application is typically coded in a browser-rendered language such as HTML combined with JavaScript®. A website may include several applications that make up the entire website. A browser is needed to access the website and run web applications included in the website.

When a mobile phone uses both a native application and a browser application to control an IPTV device, a seamless transition between the two applications is preferred. A seamless transition between a native application and a web application means that both applications need to remember their states and also communicate common functionalities with each other so that they are in synchronization. The native application may call another native application and stay synchronized with the other native application, which may be achieved by an internal server or processor of the mobile device. It may be preferable to use both applications to create an IPTV control for a greater controlling capability. It is noted that embodiments of the present invention include applications in machine code as well as a single web application. The present invention may be applied to a native application and multiple second applications, such as multiple web applications. The present invention may also be applied to any number of applications of various architectures. For example, the applications may be written using other architectures such as Java®, Adobe Flash®, or code that is interpreted at run time, such as Perl®.

The state of a native application may include information of discovered IPTV devices, communication status with each IPTV devices, control functions, image quality settings, and URL of a program or program providers. The state of a web application may include information of, or related to, any one or combination of an electronic program guide, search words, search results, and/or the process of a currently playing program.

According to the present invention, a solution to an inter-process communication between a native application and a second application is disclosed. In general, a parent-child relationship is set for the native application and the second application (e.g., a web application). The native application may be a parent, while the second application may be a child. Thus, when the second application is a web application, the browser is a child application of a native application. Alternatively, the second application may be the parent and the native application may be the child, or both applications could have been launched by another application, which may be the operating system.

The native application determines the size of a browser used by the web application and launches the web application with a specific URL, which relates current state information of the native application. When an IPTV device is selected by the user, the native application finds the IPTV device through predetermined device discover protocol. The second application obtains the state information of the native application and is loaded with the state information to be in synchronization with the native application. Both the native application and the browser are displayed on the same screen. The browser may take a larger part of the screen than that of the native application. The user can easily switch out of the second application and enter the native application and use the native application's features. At the same time, the user can switch back to the second application, which may be a web application, without any state loss because the second application is not terminated.

Alternatively, the native application could be programmed to identify a plurality of suitable devices, or first devices. This may be done by the native application identifying more than one reachable device and providing that information to the second application. The second application may then present a list of suitable devices to the user such that the user can select a desired device. The list could be presented to the user in a desired sequence, such as suitable devices with the most capabilities are presented first, or most-often used suitable devices are presented first, or the most recently used suitable device could be presented first, or set that device as the default device, or a device that is associated with a user's profile.

Alternatively, the device selection could be done in the second application. For example, the native application may pass the first device information to the second application and the second application would make the selection. In an embodiment in which the user is given a choice, the second application provides an interface for choosing a desired device that conforms to the interface presented by the second device.

When the user changes settings in the native application, the second application is re-launched with the new setting. Previous state information of the second application is stored in the native application to recover the previous state with the new settings. The second application is re-launched when the user returns to the second application. In another embodiment, the native application calls a JavaScript, which indicates the new setting values. The native application may also call other available codes implemented in the browser.

When the user changes something in the second application, for example, the selected IPTV device, the second application needs to communicate this with the native application. The second application sends a request to an internal server of the second device for which the native application is in communication with or "listening to". Current states of the second application are communicated to the native application so that the native application may re-launch the second application with the correct setting and states.

Figure 5:
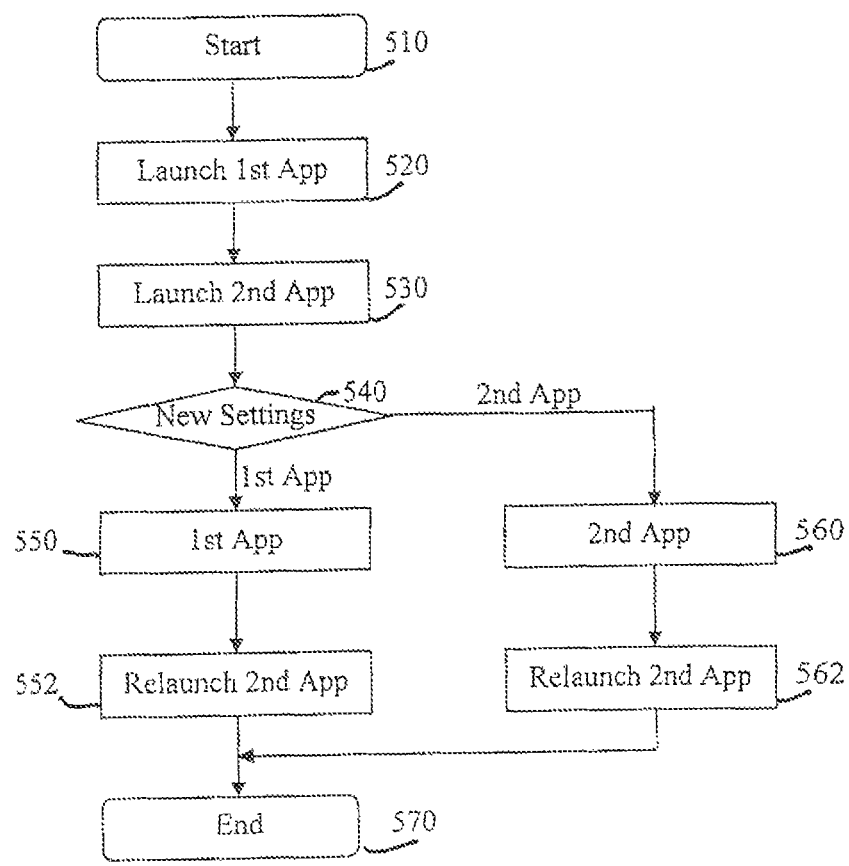
FIG. 5 shows a flow chart of switching between a native application and a second application according to an embodiment of the present invention.

FIG. 5 shows a flow chart 500 of a control process between a native application and a second application.

As shown in step 510, a user may click an icon, displayed on his IPTV device, of a second device to start an IPTV control. A native application is launched on the second device, as shown in step 520. The native application receives the user's input and communicates with a proxy server and transmits information for starting an IPTV control. The information may include, for example, account information, authentication information, list of the user's favorite programs, and etc. The proxy server relays received information to a management server, which verifies the user's credentials and transmits service information associated with the user's account to the second device. The service information is included in a data file, such as an HTML file and may be coded by a browser of the second device. The native application, after receiving the HTML file, launches the second application, which may be, for example, a browser application (web application), as shown in step 530. The second application (web application) and the native application are displayed on the same screen so that the user may view the state of the second application (e.g., browser) and the native application at the same time. In one embodiment, the second application (browser) may take 70% of the screen, while the native application may take 30% of the screen. Alternatively, the size of the second application display may be determined based on the amount of the information to be displayed. Generally speaking, the second application typically takes a greater part of the screen than that of the native application. The second application may include several web applications.

At step 540, a new setting is determined. This setting change may be made through a native application or a second application. For example, the user may start a device discovery process or may change to a different channel using the native application. The user may also change a search key word or a time interval, for example, a time interval of a search of an EPG (electronic program guide), or a time interval of a search, using the second application. When a new setting in the native application is detected, at step 550, the current state information (e.g., current state of an EPG search, state of a key word search, search results of the EPG or key word search results) is transmitted to the proxy server and the management server. The previous state of the second application is stored in the native application. The proxy server and the management server will retrieve additional information according to the new settings and transmit additional information back to the second device. At step 552, the native application will re-launch the second application to display the updated information. The updated information typically includes a portion of the original information as well as updated original information.

When a new setting in the second application is detected at step 560, the second application sends a request to an internal server of the second device to update the new setting. The internal server will transmit the new setting to the native application at step 560. The native application may also use the new settings and may re-launch the second application, if needed, as shown in step 562.

Step 570 shows the process ends.

Figure 6:
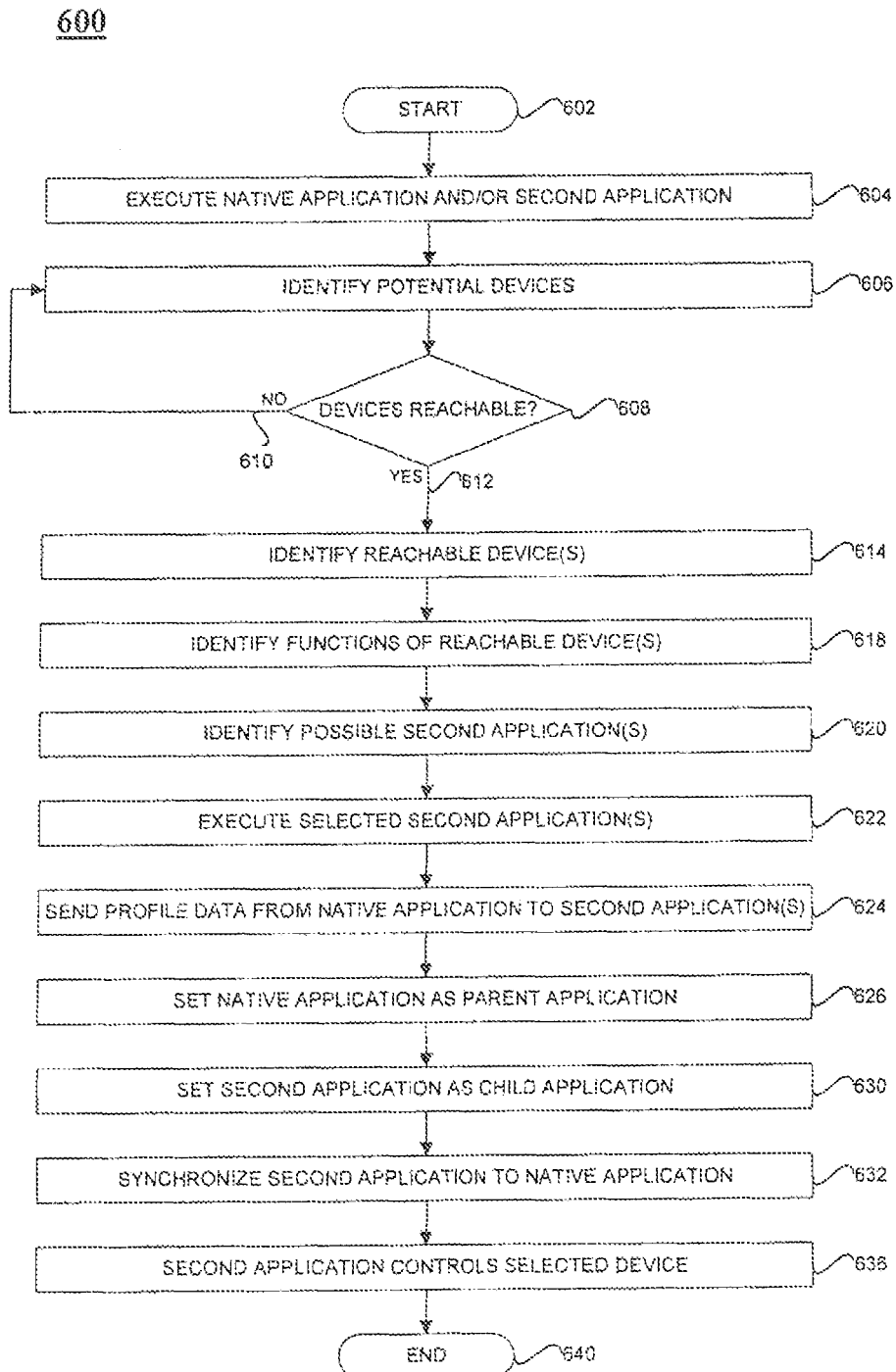
FIG. 6 shows a flow chart of steps to launch a native application and a second application according to an embodiment of the present invention.

FIG. 6 shows a flow chart of steps 600 to launch a native application and a second application according to an embodiment of the present invention. The steps 600 as shown in FIG. 6 may be stored on an electronic storage medium, such as a non-transitory computer-readable medium, such as RAM, ROM, EEPROM, or other medium that may be accessed by a processing device.

As shown in FIG. 6, the process begins at start step 602. Step 604 shows that the native application is executed; this may be executed on an IPTV device. Alternatively, a second application may also be executed in this step as well. Step 606 shows that potential devices (first devices), such as IPTV devices, are identified. The potential devices are modules or display units or monitors, which may be IPTV devices or which are part of, or coupled to, one or more IPTV devices, that may be used to display data in the form of pixels or electronic output. According to an embodiment, the native application may default to a last selected device as a selected device. Yet another embodiment of the present invention is that the native application defaults to the most often used device as a selected device. According to an embodiment, when only a single device is identified by the native application, the native application designates that single device as a selected device. According to another embodiment of the present invention, the native application may identify more than one reachable device and provide that information to the second application. The second application then presents that information to the user for the user to choose a target device, or a selected device. Also, the second application may include program code to select a particular device from the devices identified as reachable. According to another embodiment, the device selection is performed by the second application. For example, the native application could pass the first device information to the second application and the selection would be made by the second application. The user may be provided with a choice of devices and the second application may provide an interface for the selection of a device. This would enable the user to choose a first device that fits with interface provided by the second application.

In step 608, a determination is made whether a potential device is "reachable". A reachable device is a device, such as an IPTV device, that is available for communication. The native application places an Application Program Interface (API) call, via a network, to identify possible (reachable) devices. This determination for reachability may include a determination for example, if the device(s), including IPTV device(s), are in the same local network and may include a determination of whether the device is "on" or "off", or is within a predefined proximity.

If it is determined, in step 608, that that a particular device is not reachable, such as when the device, such as an IPTV device, is off or in a "do not disturb" mode, or on a different network where an IP address is not addressable outside of the local network where the IPTV device is located, the method follows the "no" line (610) and proceeds to step 606, which shows that other potential devices are identified. This may be accomplished by the native application issuing additional APIs.

Alternatively, in one embodiment, the device to be used may be determined based on a default setting to the most recently used device. Alternatively, a user may be asked to provide an identifier that identifies a preferred device.

Alternatively, in another embodiment, when a device is identified as not reachable, a user that launched the native application may be notified that the device is not currently available and asked to select another device or wait a period of time before making another selection.

In another embodiment, when the device (such as IPTV device) is in a "do not disturb" mode, the native application may determine that the IPTV device is reachable, but cannot currently play content. The native application may inform the user that the device cannot currently play content.

Alternatively, a device with the most capabilities may be chosen by default. For example, when a device has audio capabilities, such a device may be rated higher, or given preferred status, particularly when a user wishes to play video content that includes audio. Alternatively, a selected device could be selected because it was previously chosen, or because it was stored in the user profile, or because it has been set by default.

In yet another embodiment, the native application may contact the device (IPTV device) through an external server. In this embodiment, if the IPTV device has a local address that is only addressable from within the same local network, the IPTV device establishes communication with the external server to be receptive to attempts for communication. The IPTV device may still not be reachable, for example when the IPTV device is not currently connected to a power supply.

Alternatively, the IPTV device may also be reachable, but may not accept the request to play the content, such as when it is in a do not disturb mode. One example includes requesting a status indication from the selected IPTV device regarding present activity of the selected IPTV device. The selected IPTV device then sends a response to the status request to the server or to the native application, which can send the response to the server. Then the server, in communication with the native application and selected IPTV device, determines a time when the selected IPTV device will be reachable based on the response. This information can then be sent to the native application.

Also, the native application can communicate the availability of multiple first devices to the second application and the application chooses the first device t target. There can be several methods for the second application to choose the first device to target, such as defaulting to the last used first device, or presenting the choices to the user, or selecting devices that have desired output and/or processing capabilities.

If one or more devices are reachable, "yes" line 612 shows that reachable devices are identified, as shown in step 614.

The functions of the one or more reachable devices are identified, as shown in step 618. This is useful since a determination, or selection, between reachable devices may be based on what functions the device is capable.

One or more second applications are identified, as shown in step 620 and step 622 shows that one or more second applications are launched. The second application may be launched in a mobile device for controlling the device (e.g., an IPTV device). Also, the second application is typically executed according to settings of the native application.

As shown in step 624, profile data is sent from the native application to the second application(s). According to an embodiment, the native application transmits user authentication information to the second application. This information may also include a user profile to the second application.

The native application is set as the parent application (626) and the second application is set as the child application (630). According to an embodiment, the second application executes functions different from the native application.

As shown in step 632, the second application is synchronized to the native application. Alternatively, synchronizing the second application and the native application may be done when a change occurs in the native application, the second application, or a platform of the control device that is hosting the second application (e.g., a mobile device).

Thus, as shown in step 636, the second application may be used, via a mobile device or other suitable control device, to control the selected device, such as an IPTV device.

According to an embodiment, the second application is used to control IPTV program browsing, displays functionalities associated with the IPTV device, and executes communication between the control device (e.g., mobile device) and the IPTV device.

The process ends at end step 640.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method, executed by a processor, for controlling a native application and a second application, the second application being launched in a second device for controlling a first device, the method comprising the steps of:
   executing a first device discovery process to designate a particular first device as a selected first device;
   executing the second application according to settings of the native application;
   sending user profile data from the native application to the second application and user authentication information to the second application;
   causing the native application to be a parent application and the second application to be a child application;
   synchronizing the second application and the native application, synchronization being synchronizing such that the second application includes functions for controlling the selected first device;
   identifying device capabilities of one or more first devices;
   presenting the device capabilities of the one or more first devices to a user;
   determining user criteria for a particular user;
   comparing the device capabilities of the one or more first devices to the user criteria; and
   displaying a list of first devices, to a user, in a sequence that is function of the comparing step,
   wherein the native application transmits information about the selected first device to the second application, the information includes a list of functionalities associated with the selected first device, and
   wherein synchronizing the second application and the native application includes synchronizing when a change occurs in a platform of the second device that is hosting the second application.

2. The method according to claim 1, wherein the first device discovery process:
   identifies more than one reachable first devices; and
   presents an inquiry for a user to select one reachable first device.

3. The method according to claim 1, wherein the first device discovery process:
   communicates an availability of a plurality of first devices to the second application; and
   the second application identifies a particular first device to target from the plurality of first devices.

4. The method according to claim 1, wherein the second application:
   controls IPTV functionalities associated with the selected first device; and
   executes communication between the second device and the selected first device.

5. The method according to claim 1, wherein the information about the selected first device includes an identifier of the selected first device.

6. The method according to claim 1, wherein the second application executes functions different from the native application.

7. The method according to claim 1, wherein the native application defaults to a last selected first device as a selected first device.

8. The method according to claim 1, wherein when a single first device is discovered, the native application designates that single first device as the selected first device.

9. The method according to claim 1, wherein the native application defaults to a most often used first device as a selected first device.

10. The method according to claim 1, wherein the first device discovery process defaults to a first device that has the most capabilities as a selected first device.

11. The method according to claim 1, wherein the first device discovery process defaults to a most recently used first device as a selected first device.

12. The method according to claim 1, wherein the selected first device is selected by a default setting set by a user and stored in a user profile associated with the user.

13. The method according to claim 1, wherein the second application presents choices for alternate first devices to a user.

14. The method according to claim 1, wherein the native application presents choices for alternate first devices.

15. The method according to claim 1, wherein choices for alternate first devices are presented by the second application based on information from the native application related to first device availability and first device reachability.

16. The method according to claim 1, wherein the native application executes the first device discovery process.

17. The method according to claim 1, wherein the second application executes the first device discovery process.

18. A non-transitory computer-readable medium having stored thereon a program that when executed by a processor causes the processor to perform a method for controlling a native application and a second application, the second application being launched in a second device for controlling a first device, the method comprising the steps of:

executing a first device discovery process to designate a particular first device as a selected first device;

executing the second application according to settings of the native application;

sending user profile data from the native application to the second application and user authentication information to the second application;

causing the native application to be a parent application and the second application to be a child application; and synchronizing the second application and the native application, synchronization being synchronizing such that the second application includes functions for controlling the selected first device;

identifying device capabilities of one or more first devices;

presenting the device capabilities of the one or more first devices to a user;

determining user criteria for a particular user;

comparing the device capabilities of the one or more first devices to the user criteria; and displaying a list of first devices, to a user, in a sequence that is function of the comparing step, wherein the native application transmits information about the selected first device to the second application, the information includes a list of functionalities associated with the selected first device, and wherein synchronizing the second application and the native application includes synchronizing when a change occurs in a platform of the second device that is hosting the second application.

* * * * *